(12) United States Patent
Narikawa et al.

(10) Patent No.: US 10,152,177 B2
(45) Date of Patent: Dec. 11, 2018

(54) MANIPULATION DETECTION APPARATUS, MANIPULATION DETECTION METHOD, AND PROJECTOR

(71) Applicant: Maxell, Ltd., Kyoto (JP)

(72) Inventors: Sakiko Narikawa, Tokyo (JP); Takashi Matsubara, Tokyo (JP); Naoki Mori, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 14/172,030

(22) Filed: Feb. 4, 2014

(65) Prior Publication Data

US 2014/0253512 A1    Sep. 11, 2014

(30) Foreign Application Priority Data

Mar. 11, 2013  (JP) .................................. 2013-048306

(51) Int. Cl.
*G06F 3/042* (2006.01)
*G06F 3/03* (2006.01)

(52) U.S. Cl.
CPC .......... *G06F 3/0425* (2013.01); *G06F 3/0304* (2013.01)

(58) Field of Classification Search
CPC .... G06F 3/017; G06F 3/04883; G06F 3/0487; G06F 3/0488; G06F 3/04886; G06F 2203/04808; G06F 3/0425
See application file for complete search history.

(56) References Cited

U.S. PATENT DOCUMENTS

| 8,766,952 | B2 * | 7/2014 | Lee ....................... G06F 3/0425 345/175 |
| 9,250,745 | B2 * | 2/2016 | Van Lydegraf ....... G06F 3/0425 |
| 9,285,893 | B2 * | 3/2016 | Holz .................. G06K 9/00375 |
| 2008/0013826 | A1 * | 1/2008 | Hillis et al. .................... 382/154 |

(Continued)

FOREIGN PATENT DOCUMENTS

| JP | 2008-505381 A | 2/2008 |
| JP | 2008-59283 A | 3/2008 |

(Continued)

OTHER PUBLICATIONS

Notification of Reasons for Refusal, dated Aug. 1, 2017, which issued during the prosecution of Japanese Patent Application No. 2016-213934, which corresponds to the present application (English translation attached).

*Primary Examiner* — William Lu
(74) *Attorney, Agent, or Firm* — Baker Botts L.L.P.

(57) ABSTRACT

A shadow region extraction portion compares the brightness of an image captured by a camera with a threshold value and extracts first and second shadows caused by first and second light sources for a user's finger. An approach degree detection portion detects an approach degree for the finger with reference to a manipulation surface from distance d between two feature points in the first and second shadows. A contact point detection portion detects contact point P for the finger with reference to the manipulation surface from positions of the two feature points. A direction detection portion detects a direction pointed by the finger from directions of contours corresponding to the first and second shadows. A display control portion generates display control data for a manipulation target apparatus based on detection result data.

6 Claims, 19 Drawing Sheets

(56) References Cited

U.S. PATENT DOCUMENTS

| | | |
|---|---|---|
| 2008/0278450 A1 | 11/2008 | Lashina |
| 2009/0219256 A1* | 9/2009 | Newton ........................ 345/173 |
| 2009/0252375 A1 | 10/2009 | Rekimoto |
| 2010/0103330 A1* | 4/2010 | Morrison ............. H04N 9/3185 348/744 |
| 2010/0302395 A1* | 12/2010 | Mathe et al. .............. 348/222.1 |
| 2011/0221896 A1* | 9/2011 | Haddick .............. G02B 27/017 348/143 |
| 2011/0298722 A1* | 12/2011 | Tse .......................... G06F 3/041 345/173 |
| 2012/0182268 A1* | 7/2012 | Kitagawa et al. ............ 345/175 |
| 2012/0249463 A1* | 10/2012 | Leung .................... G06F 3/017 345/173 |
| 2013/0182897 A1* | 7/2013 | Holz ............................. 382/103 |
| 2013/0182902 A1* | 7/2013 | Holz ............................. 382/103 |

FOREIGN PATENT DOCUMENTS

| | | |
|---|---|---|
| JP | 2009-250772 A | 10/2009 |
| JP | 2011-180712 A | 9/2011 |

* cited by examiner

FIG.3A
FRONT VIEW OF MANIPULATION STATE
FIG.3B
SIDE VIEW OF MANIPULATION STATE
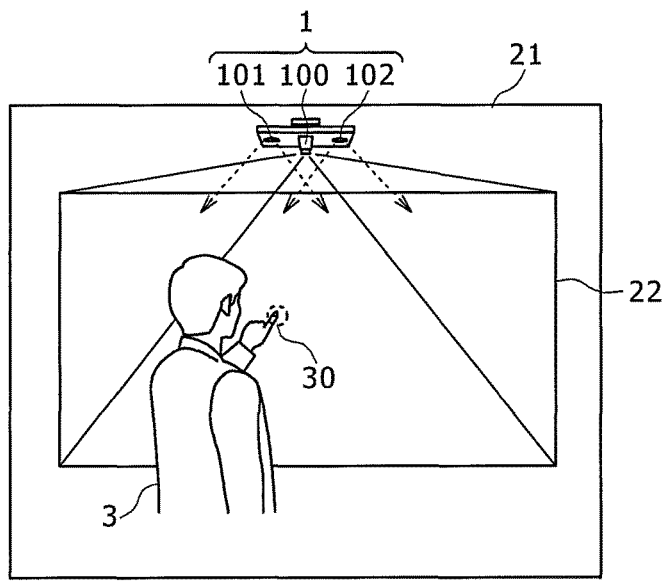
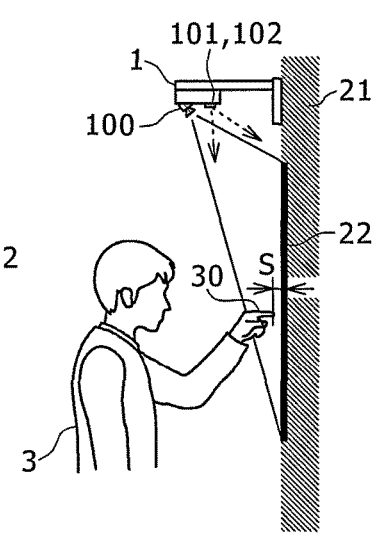

FIG.4A
FINGER NOT CONTACTED
FIG.4B
FINGER CONTACTED
TOP VIEW
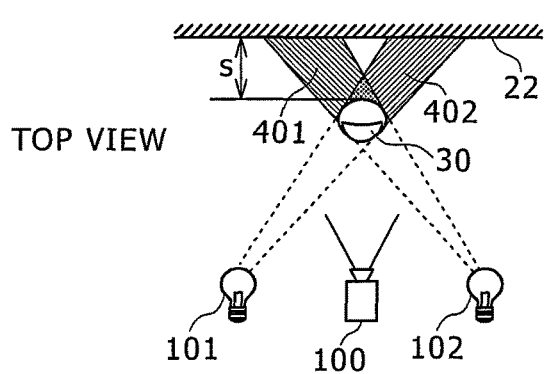 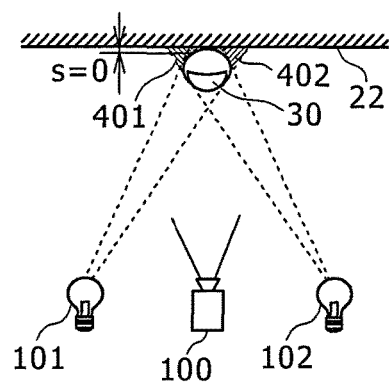
CAMERA IMAGE
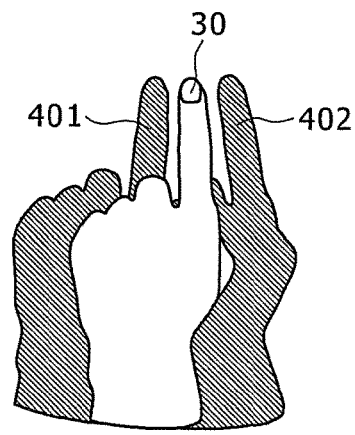 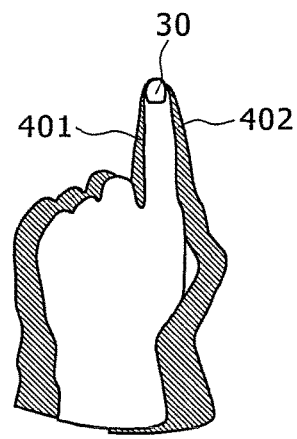

DIFFERENT MANIPULATION POSITIONS

CHANGING THE FEATURE POINT

MANIPULATION USING MULTIPLE FINGERS

DETERMINING THE FINGER-POINTING DIRECTION

USING INNER CONTOURS

USING OUTER CONTOURS

MIDLINE OF CONTOURS

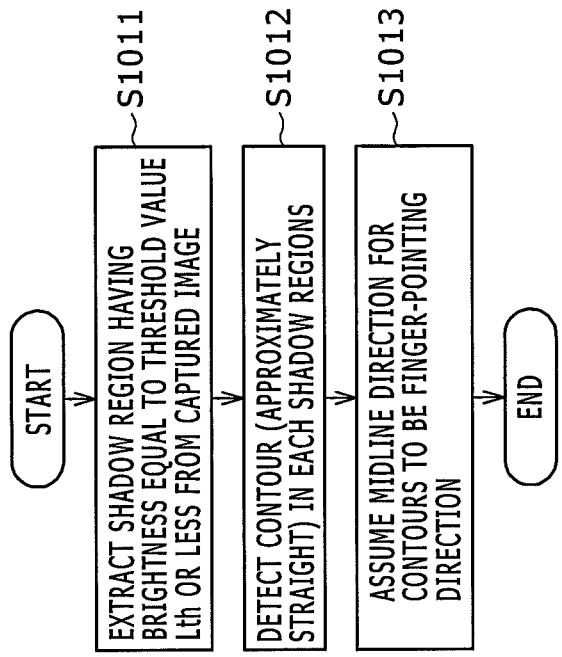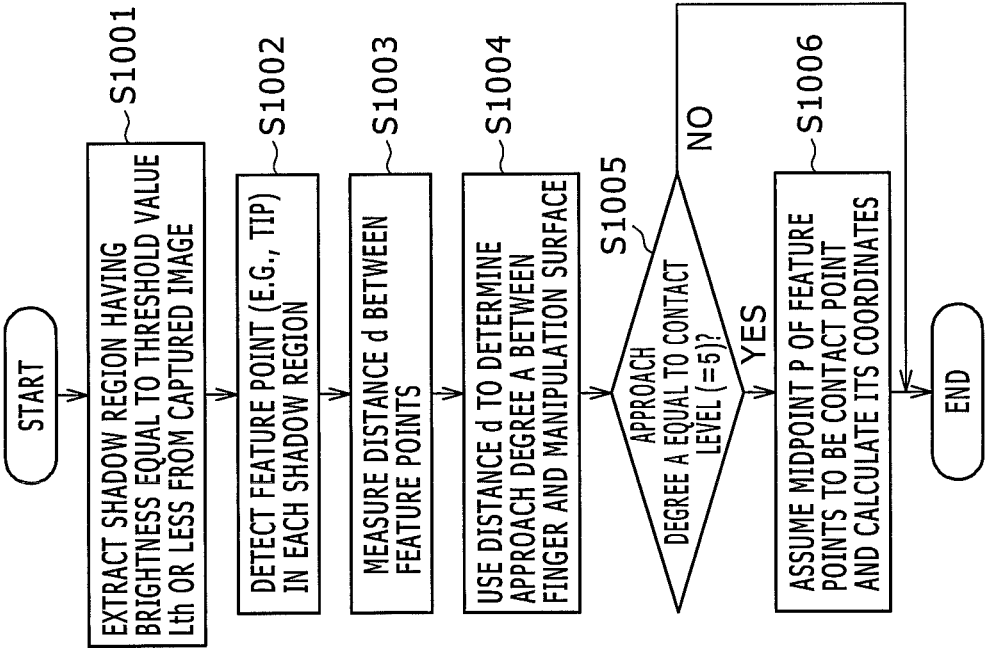

FIG.13

| APPROACH DEGREE A BETWEEN FINGER AND MANIPULATION SURFACE | MANIPULATION MODE SELECTED | POINTER DISPLAYED OR NOT |
|---|---|---|
| LEVEL 5 | CONTACT MANIPULATION MODE | DISPLAYED |
| LEVEL 4 | CONTACTLESS MANIPULATION MODE | DISPLAYED |
| LEVEL 3 | CONTACTLESS MANIPULATION MODE | NOT DISPLAYED |
| LEVEL 2 | MANIPULATION-OFF MODE | NOT DISPLAYED |
| LEVEL 1 | MANIPULATION-OFF MODE | NOT DISPLAYED |

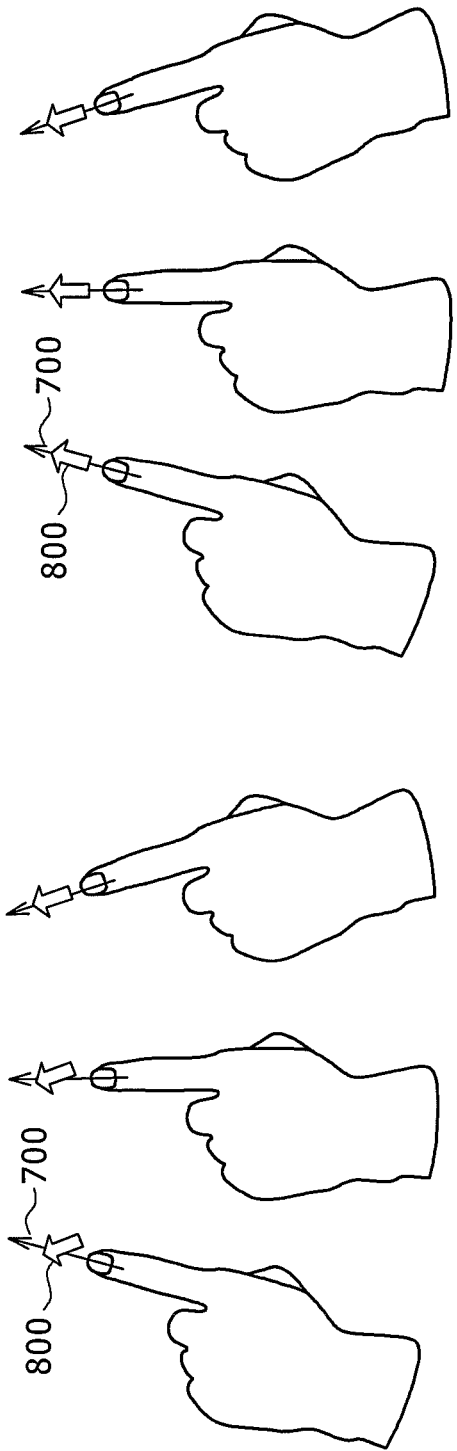
FIG.14A
CORRECTING THE POINTER
DISPLAY POSITION
FIG.14B
CORRECTING THE POINTER
DISPLAY DIRECTION
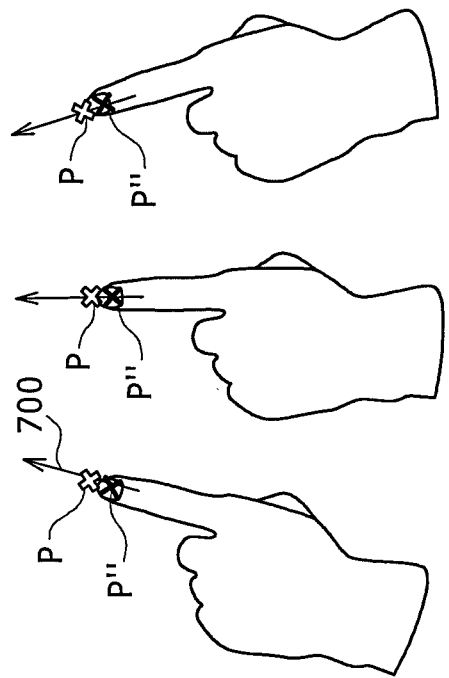
FIG.14C
CORRECTING THE
CONTACT POINT
(P→P'')

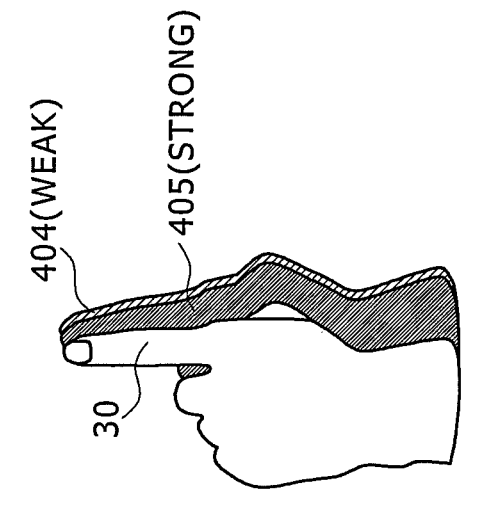
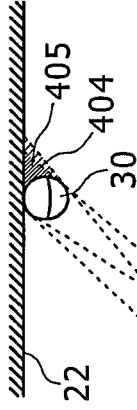
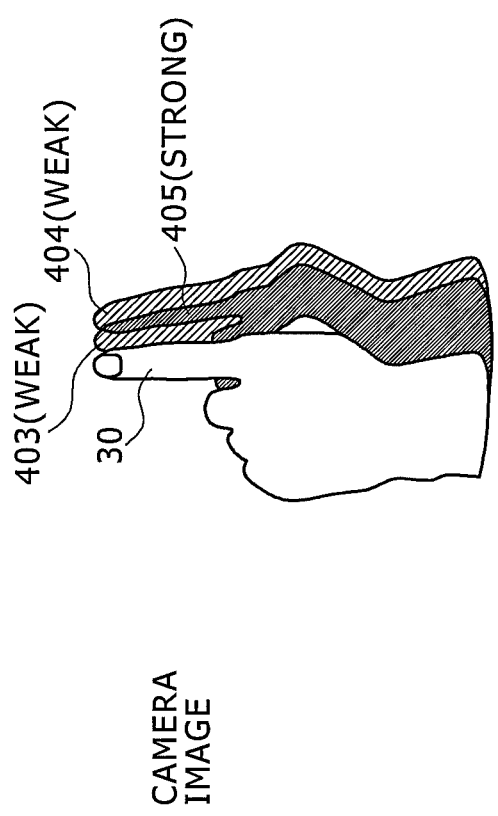
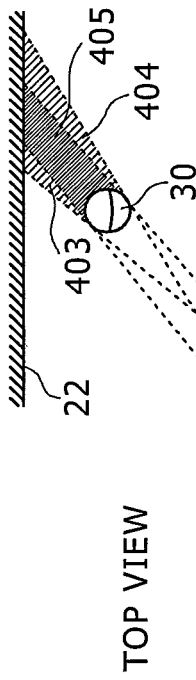

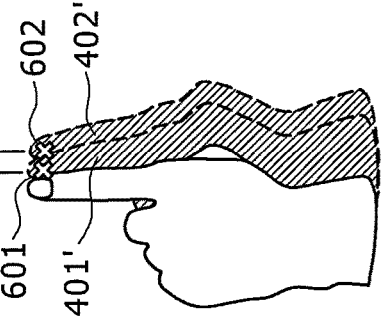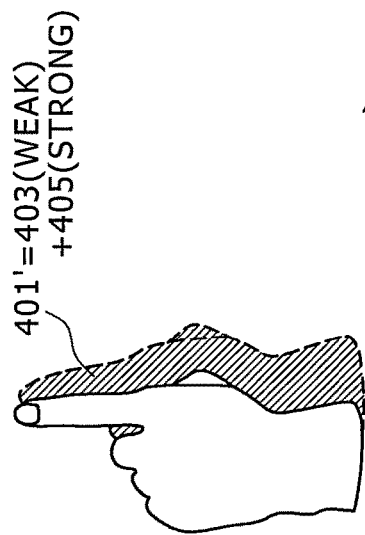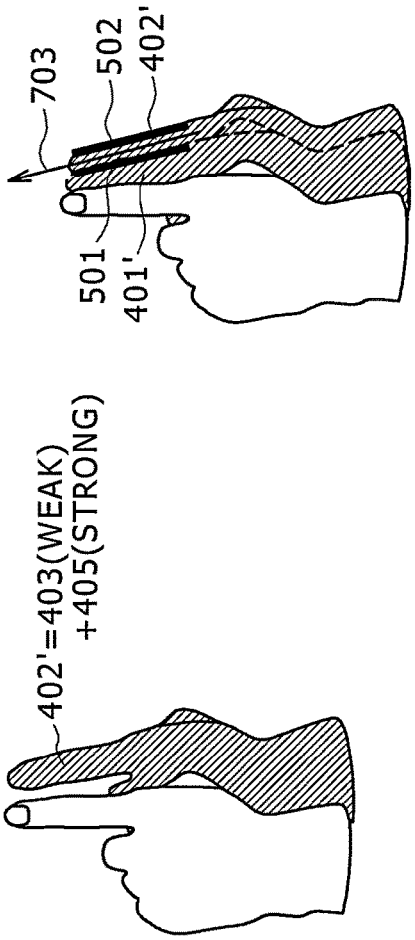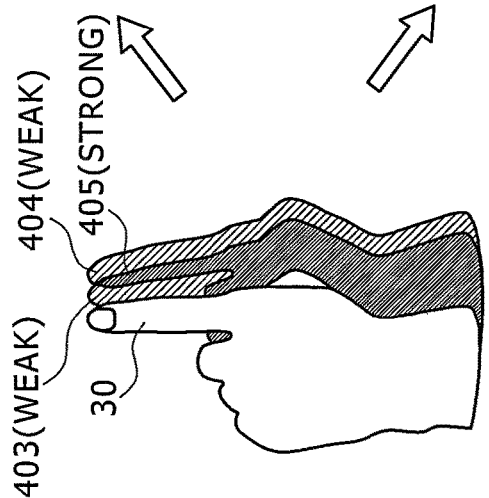

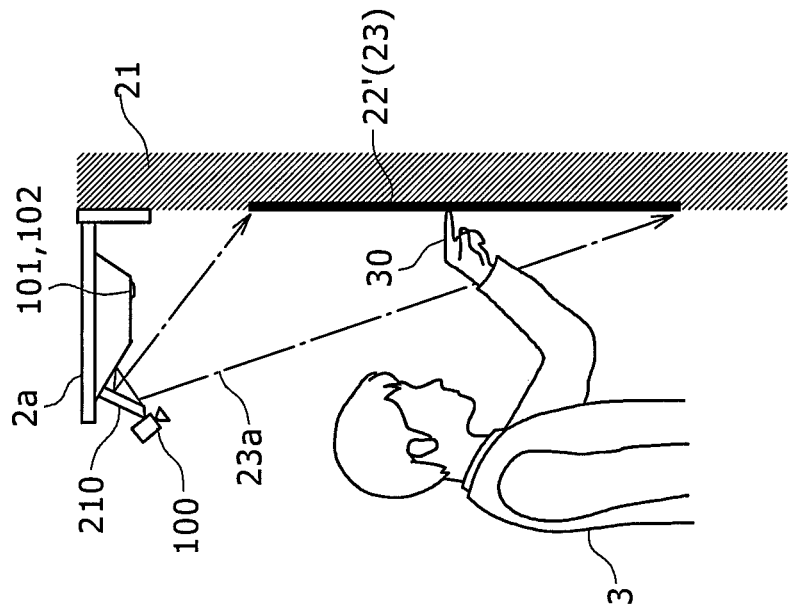
FIG.18B SIDE VIEW
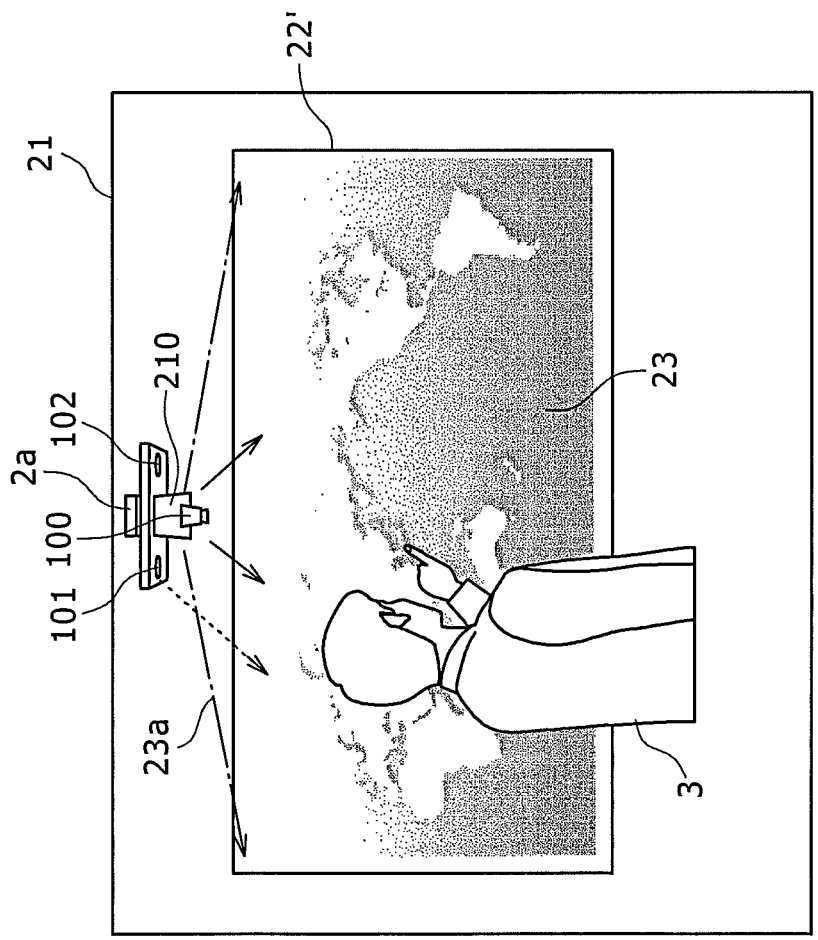
FIG.18A FRONT VIEW
SHORT-DISTANCE PROJECTOR 2a HEAD-MOUNT PROJECTOR 2b

EXTERNAL VIEW

TOP VIEW

MANIPULATION DETECTION APPARATUS, MANIPULATION DETECTION METHOD, AND PROJECTOR

CROSS-REFERENCE TO RELATED APPLICATION

This application claims the Japanese Patent Application No. 2013-048306 filed Mar. 11, 2013, which is incorporated herein by reference in its entirety.

BACKGROUND

The present invention relates to a manipulation detection apparatus, a manipulation detection method to detect manipulation of user's fingers, and a projector.

A technology is proposed to capture a user's finger, extract its shadow, and detect the finger touch manipulation as user's input manipulation on a projection surface (screen) of a projection type video display apparatus (projector) without using special devices such as touch sensors.

Japanese Unexamined Patent Application Publication No. 2008-59283 describes a manipulation detection apparatus including the following means. One means allows an image capture means to capture an operator illuminated by an illumination means. Another means detects specific physical regions of the operator based on the operator's image data acquired by the image capture means. Still another means extracts shadow portions from the detected specific physical regions of the operator. Yet another means detects multiple line segments having straight edges from the extracted shadow portions, detects a point of the detected line segments crossing to each other at an acute angle, and detects this point as a finger-pointing position in the specific physical region of the operator.

Japanese Unexamined Patent Application Publication No. 2011-180712 describes a projection type video display apparatus including the following portions. A projection portion projects videos on a screen. An image capture portion captures a region including at least a video projected to the screen. A real image detection portion detects a real image of a specific object moving over the screen from the image captured by the image capture portion. A shadow detection portion detects the shadow of the specific object from the image captured by the image capture portion when the light projected from the projection portion causes the shadow. A contact determination portion determines the specific object in contact with the screen if the distance between the real image and the shadow of the specific object is smaller than or equal to a specified threshold value. A coordinate determination portion outputs coordinates of the specific object as a pointing position to the video if the contact determination portion determines the contact.

SUMMARY

The technology described in Japanese Unexamined Patent Application Publication No. 2008-59283 extracts a shadow portion from operator's image data acquired by the image capture means. The technology detects a point of shadow edges crossing to each other at an acute angle and assumes this point as a finger-pointing position. If the hand is floated, however, the shadow of a finger may visually overlap with another finger. There may occur multiple points of shadow edges crossing to each other at acute angles. The technology may incorrectly detect a point different from the finger-pointing position. The technology is inappropriate for detecting so-called multi-touch manipulation that causes finger-pointing positions of multiple fingers with the hand opened.

The technology described in Japanese Unexamined Patent Application Publication No. 2011-180712 determines a specified object in contact with a screen if the distance between points each corresponding to a real image of the specified object (finger) and the shadow is smaller than or equal to a specified threshold value. When the hand is opened, however, the real image of a finger partially hides the shadow of another finger, making it difficult to detect points each corresponding to the real image and the shadow of the finger. Opening and floating the hand increases the distance between the real image and the shadow of the finger. For example, the real image of a finger approaches the shadow of another finger at the tips and seemingly causes the distance between points each corresponding to the real image and the shadow of the finger to be smaller than or equal to a threshold value. This may result in incorrect determination that the finger is in contact with the screen. This technology is also inappropriate for detecting the multi-touch manipulation.

The above-mentioned technologies give no consideration for detection of a gap (approach degree) between the finger and a manipulation surface during manipulation or detection of finger-pointing directions.

The present invention has been made in consideration of the foregoing. It is, therefore, an object of the invention to provide a manipulation detection apparatus and a manipulation detection method that correctly detect contact positions of multiple fingers with the hand opened and detect an approach degree between fingers and a manipulation surface and finger-pointing directions.

Configurations described in the appended claims are incorporated to address the above-mentioned problems. According to one aspect of the present invention, a manipulation detection apparatus includes: first and second light sources to radiate illumination light to the manipulation surface from different positions; a camera to capture the manipulation surface radiated by the illumination light as well as the user's finger; a shadow region extraction portion that extracts first and second shadows caused by the first and second light sources corresponding to the user's finger based on an image captured by the camera; and a manipulation state detection portion that detects at least one of manipulation states such as an approach degree, a contact point, and a direction indicated by the user's finger with reference to the manipulation surface from shapes of the extracted first and second shadows.

According to another aspect of the present invention, the manipulation state detection portion includes: a feature point detection portion to detect a feature point from each of the extracted first and second shadows; a contour detection portion to detect an approximately linear line segment as each contour of the extracted first and second shadows from the extracted first and second shadows; an approach degree detection portion to detect an approach degree for the user's finger toward the manipulation surface from a distance between the two detected feature points; a contact point detection portion to detect a contact point for the user's finger on the manipulation surface from positions of the two detected feature points; and a direction detection portion to detect a pointing direction of the user's finger from a direction of the detected contour. The approach degree detection portion determines contact of the user's finger with the manipulation surface based on a distance between the two detected feature points.

The invention can correctly detect positions of fingers in contact with the manipulation surface and detect approach degrees and finger-pointing directions between the finger and the manipulation surface without the need to provide a touch sensor on the manipulation surface. This improves manipulability of the manipulation target apparatus.

BRIEF DESCRIPTION OF THE DRAWINGS

FIG. 3 illustrates a situation of manipulation by a user using a manipulation detection apparatus 1, in which FIG. 3A is a front view of the manipulation state and FIG. 3B is a side view thereof;

FIG. 4 illustrates shadow shapes of a user finger generated by two light sources, in which FIG. 4A illustrates the finger not in contact with a manipulation surface and FIG. 4B illustrates the finger in contact with the same;

FIG. 11 illustrates determination of a finger-pointing direction according to contours, in which

FIG. 12 illustrates process flows of the manipulation detection method, in which FIG. 12A illustrates detection of an approach degree and a contact point and FIG. 12B illustrates detection of a finger-pointing direction;

FIG. 13 illustrates an example of control according to a finger approach degree;

FIG. 14 illustrates an example of control according to finger-pointing directions, in which FIG. 14A illustrates correcting the pointer display position, FIG. 14B illustrates correcting the pointer display direction, and FIG. 14C illustrates correcting pointer contact points;

FIG. 15 illustrates two shadows overlapping with each other (second embodiment), in which FIG. 15A illustrates a finger not in contact with the manipulation surface and FIG. 15B illustrates a finger in contact with the manipulation surface;

FIG. 16 illustrates a method of separating an overlapping shadow, in which FIG. 16A illustrates detecting shadows, FIG. 16B illustrates separating the shadow, FIG. 16C illustrates detecting distance d, and FIG. 16D illustrates detecting the finger-pointing direction;

FIG. 18 illustrates a short-distance projector, in which FIG. 18A is a front view and FIG. 18B is a side view; and FIG. 19 illustrates a head-mount projector, in which

DETAILED DESCRIPTION

Embodiments of the present invention will be described in further detail with reference to the accompanying drawings.

First Embodiment

The first embodiment uses one camera and two light sources. The following describes an approach degree between a manipulation surface and a user's finger toward the manipulation surface, a contact point between the finger and the manipulation surface, and a manipulation detection apparatus to detect a direction (finger-pointing direction) pointed by the finger, and a manipulation detection method.

Figure 1:
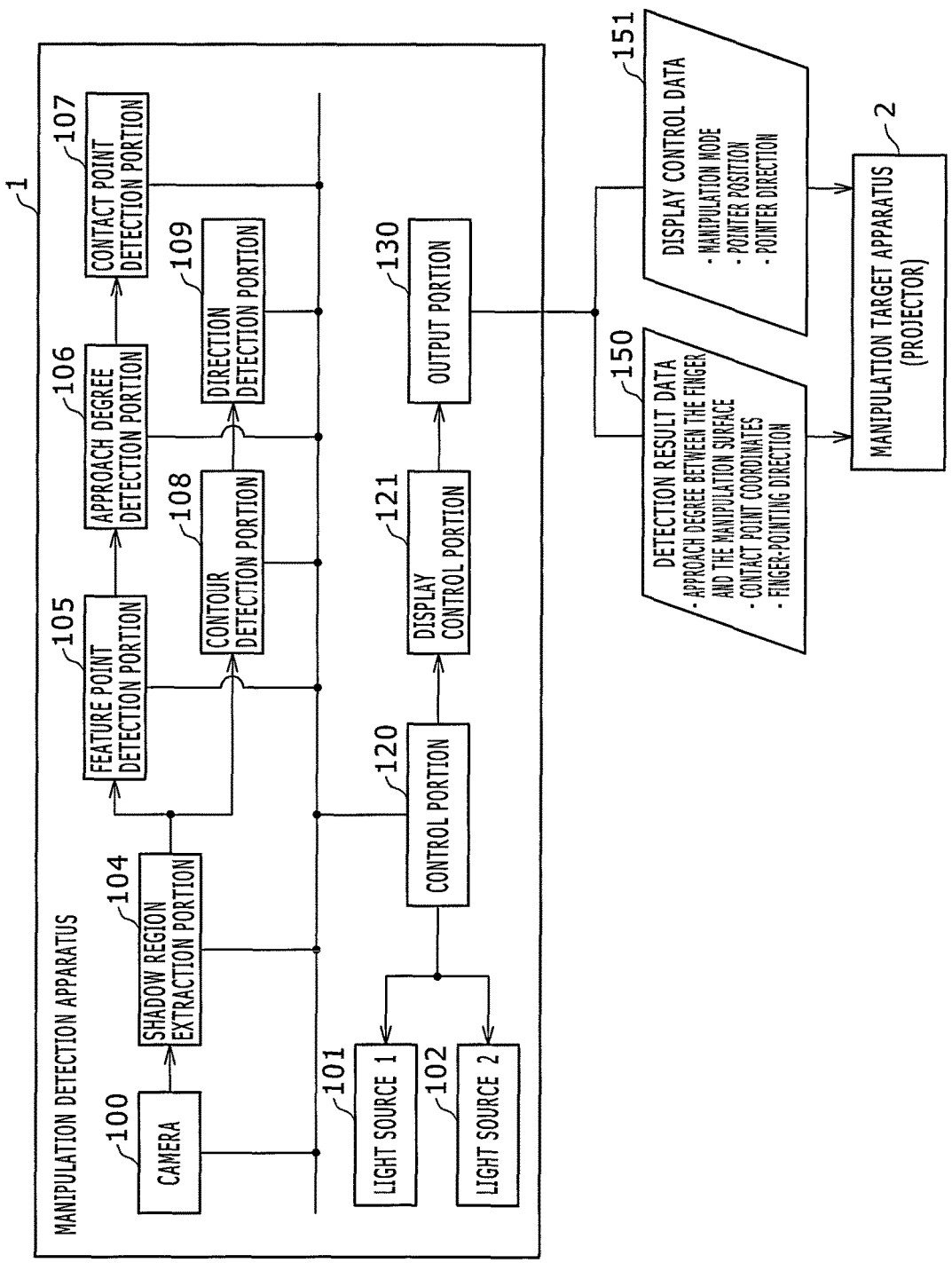
FIG. 1 is a configuration diagram illustrating a manipulation detection apparatus according to a first embodiment.

FIG. 1 is a configuration diagram illustrating the manipulation detection apparatus according to the first embodiment. A manipulation detection apparatus 1 includes a camera 100, two light sources 101 and 102, a shadow region extraction portion 104, a feature point detection portion 105, an approach degree detection portion 106, a contact point detection portion 107, a contour detection portion 108, a direction detection portion 109, a control portion 120, a display control portion 121, and an output portion 130. The control portion 120 generates detection result data 150 concerning manipulation states such as an approach degree between the finger and the manipulation surface, contact point coordinates, and finger-pointing directions detected by the corresponding detection portions. Based on detection results, the display control portion 121 generates display control data 151 such as a manipulation mode, a pointer display position, and a pointer display direction and outputs the display control data 151 to a manipulation target apparatus 2 from the output portion 130. The manipulation target apparatus 2 exemplifies a projector (video projection and display apparatus). The manipulation target apparatus 2 receives the detection result data 150 and the display control data 151 to display videos in response to user manipulation.

As illustrated in FIG. 1, the components 100 through 109, 120, 121, and 130 are all configured inside the manipulation detection apparatus 1. Some of the components may be externally connected. For example, the camera 100 and the light sources 101 and 102 may be configured outside the manipulation detection apparatus 1 and may be connected via a network or a universal serial bus (USB). The display control portion 121 may be provided for the manipulation target apparatus 2, not inside the manipulation detection apparatus 1.

Figure 2:
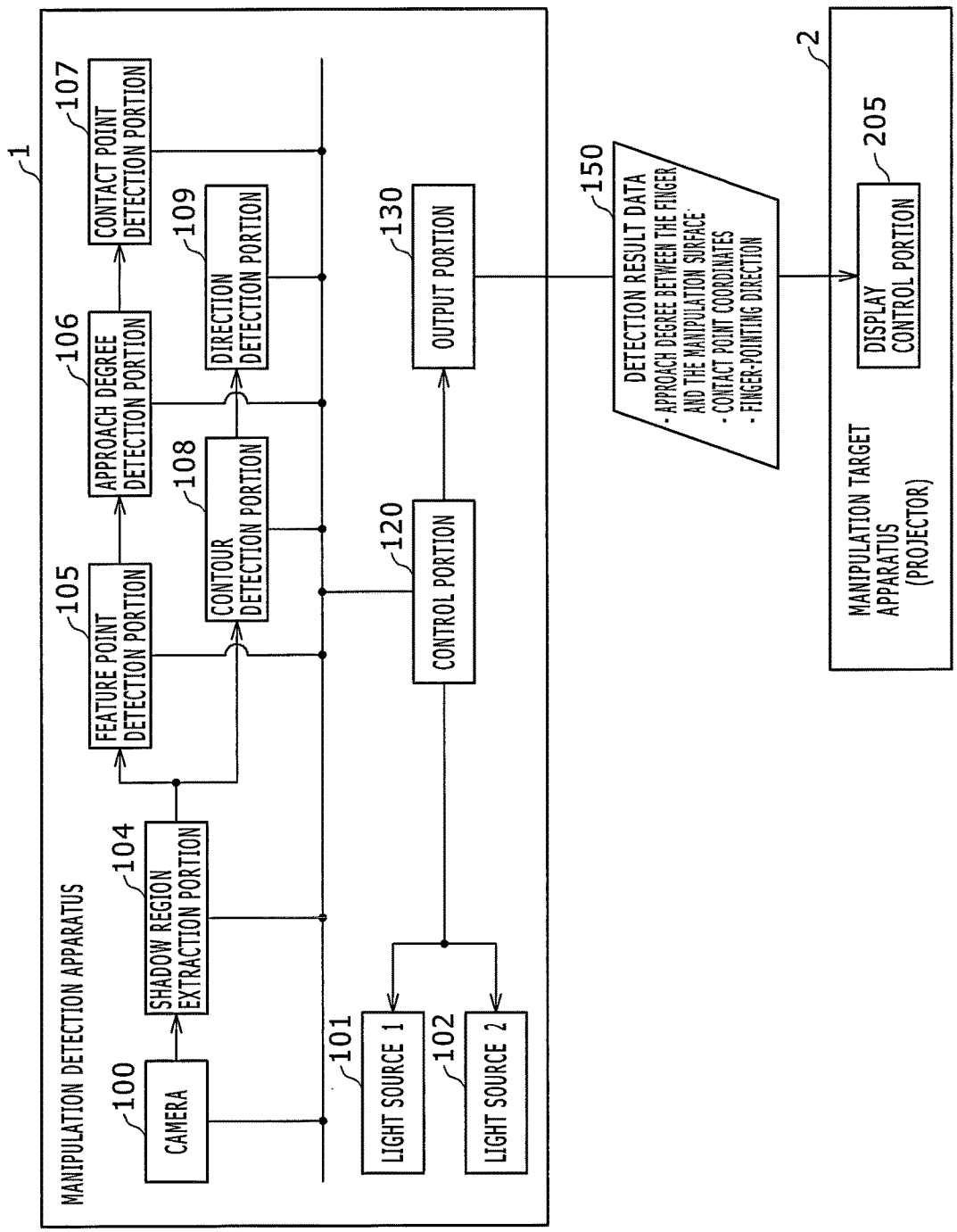
FIG. 2 is a configuration diagram illustrating a modification of FIG. 1.

FIG. 2 is a configuration diagram illustrating a modification of the manipulation detection apparatus illustrated in FIG. 1. A display control portion 205 is provided inside the manipulation target apparatus 2. The display control portion 205 of the manipulation target apparatus 2 generates the display control data 151 such as manipulation mode based on the detection result data 150 output from the manipulation detection apparatus 1. The manipulation target apparatus 2 can provide the control similar to that available for the configuration as illustrated in FIG. 1.

Each of the components 100 through 109, 120, 121, and 130 is independent of each other but may include one or more components as needed. For example, one or more central processing units (CPUs) may perform processes for the components 104 through 109, 120, 121, and 130.

FIGS. 3A and 3B illustrate a situation of manipulation by a user 3 using the manipulation detection apparatus 1. FIG.

3A is a front view of the manipulation state. FIG. 3B is a side view thereof. The user moves his or her finger 30 close to a manipulation surface 22 of a wall surface 21 or allows the finger 30 to contact a given position to perform intended manipulation. The manipulation target apparatus 2 is assumed to be a projector. The manipulation surface 22 functions as a screen to display a projection video. The user manipulates images projected on the screen.

The manipulation detection apparatus 1 is mounted on an upper part of the wall surface 21. The two light sources 101 and 102 sandwich the camera 100 and are provided at horizontally different positions on the wall surface 21. The two light sources 101 and 102 lighten the finger 30 of the user 3. The camera 100 captures the finger 30 and its vicinity. The shadow of the finger 30 varies its shape as the finger 30 approaches or contacts the manipulation surface 22. The manipulation detection apparatus 1 analyzes images of the camera 100 to detect the finger's approach degree, contact point, and finger-pointing direction.

The following describes operation of the components of the manipulation detection apparatus 1. The camera 100 includes an image sensor and a lens and captures images including the finger 30 of the user 3. The two light sources 101 and 102 each include a light-emitting diode, a circuit board, and a lens. The light sources 101 and 102 radiate illumination light to the manipulation surface 22 and the finger 30 of the user 3 and projects the shadow of the finger 30 onto an image captured by the camera 100. The light sources 101 and 102 may be available as infrared light sources. The camera 100 may be available as an infrared light camera. In this case, the camera 100 can capture an infrared light image and separate it from a visible light video projected from the manipulation target apparatus 2 (projector).

The shadow region extraction portion 104 extracts a shadow region from the image captured by the camera 100 and generates a shadow image. For example, the shadow region extraction portion 104 can generate a difference image by subtracting a previously captured background image of the manipulation surface 22 from the image captured when the manipulation was detected. The shadow region extraction portion 104 can digitize the difference image brightness based on specified threshold value Lth and detects the shadow region that is smaller than or equal to the threshold value. In addition, the shadow region extraction portion 104 performs a so-called labeling process on the extracted shadow to identify unconnected shadow regions as discrete shadows. The labeling process can identify correspondence between a finger and extracted shadows, that is, a pair of shadows corresponding to one finger.

The feature point detection portion 105 detects a specific position (hereinafter referred to as a feature point) in a shadow image extracted by the shadow region extraction portion 104. For example, the feature point to be detected includes a tip position (corresponding to a fingertip position) in the shadow image. Various techniques are used to detect the feature point. The tip position can be detected from coordinate data for pixels constituting the shadow image. The image recognition can be used to detect a part corresponding to the shape specific to the feature point. One feature point is detected from one shadow. Therefore, two feature points are detected from one finger (two shadows).

The approach degree detection portion 106 measures distance d between two feature points detected by the feature point detection portion 105 and detects gap s (approach degree A) between the finger and the manipulation surface based on distance d. The approach degree detection portion 106 thereby determines whether the finger contacts the manipulation surface.

If the approach degree detection portion 106 determines that the finger contacts the manipulation surface, the contact point detection portion 107 detects a contact point between the finger and the manipulation surface based on the feature point position and calculates coordinates for the contact point.

The contour detection portion 108 extracts a contour of the shadow region from the shadow image extracted by the shadow region extraction portion 104. To obtain the contour, for example, the contour detection portion 108 scans within the shadow image in a given direction, determines a pixel to start tracing the contour, and counterclockwise traces pixels near the starting pixel.

The direction detection portion 109 extracts an approximately linear line segment from the contour detected by the contour detection portion 108. The direction detection portion 109 detects a finger-pointing direction of the finger on the manipulation surface based on the direction of the extracted contour.

The processes of the detection portions are not limited to the above-mentioned techniques and may use other image processing algorithms. The above-mentioned detection portions are available as software as well as hardware including the circuit boards.

The control portion 120 controls operation of the entire apparatus and generates the detection result data 150 detected by the detection portions, that is, the finger's approach degree, contact point coordinates, and finger-pointing direction with reference to the manipulation surface.

The display control portion 121 generates the display control data 151 such as manipulation mode, pointer position, and pointer direction for the manipulation target apparatus 2 (projector) based on the detection result data 150 such as the finger's approach degree, contact point coordinates, and finger-pointing direction generated by the control portion 120.

The output portion 130 providers an interface that outputs the generated detection result data 150 or display control data 151 to the manipulation target apparatus 2. The output portion 130 uses network connection or universal serial bus (USB) connection and includes an ultrasonic unit and an infrared communication apparatus.

FIGS. 4A and 4B illustrate shadow shapes of a user finger generated by two light sources. FIG. 4A illustrates the finger 30 not in contact with the manipulation surface 22. FIG. 4B illustrates the finger 30 in contact with the same. FIGS. 4A and 4B each include a top view from the top of the manipulation surface 22 and a camera image.

FIG. 4A illustrates that the finger 30 does not come in contact with the manipulation surface 22 (gap s). The finger 30 interrupts the light from the two light sources 101 and 102 to form shadows 402 and 401 (shaded). As illustrated in the camera image, the two shadows 401 and 402 separate towards both sides of the finger 30.

FIG. 4B illustrates that the finger 30 comes in contact with the manipulation surface 22 (gap s=0). The two shadows 401 and 402 are close formed at the tip of the finger 30. The finger 30 partially hides the shadows 401 and 402. The hidden part is not included in the shadow region. The embodiment determines contact between the finger 30 and the manipulation surface 22 using such characteristics that moving the finger 30 close to the manipulation surface decreases the space (especially the distance between the feature points) between the shadows 401 and 402.

Figure 5:
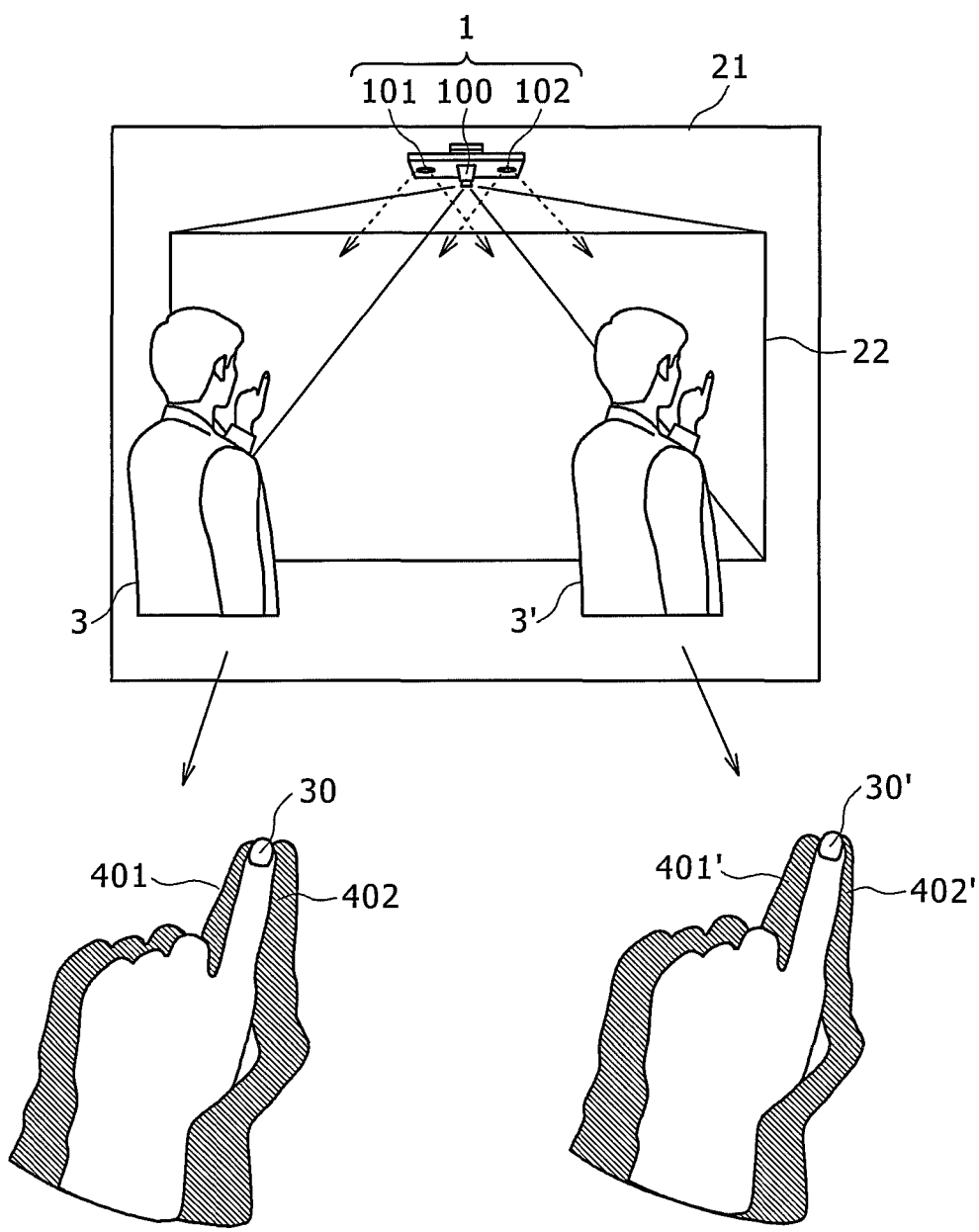
FIG. 5 illustrates an effect of shadow shapes depending on user manipulation positions.

FIG. 5 illustrates an effect of shadow shapes depending on user manipulation positions. FIG. 5 compares camera images captured when the user manipulation position is moved to the left (user position 3) and to the right (user position 3') from the center of the manipulation surface 22. The user manipulation position changes when viewed from the camera 100. However, the camera images maintain unchanged positional relationship of the shadows 401 (401') and 402 (402') with reference to the finger 30 (30'). The shadows 401 (401') and 402 (402') are always positioned at both sides of the finger 30 (30') regardless of user manipulation positions. This is because the positional relationship among the camera 100 and the light sources 101 and 102 uniquely determines the positional relationship among the finger and the shadows. Therefore, the two shadows 401 and 402 can be detected wherever the user manipulates the manipulation surface 22. The manipulation detection method according to the embodiment is applicable effectively.

Figure 6:
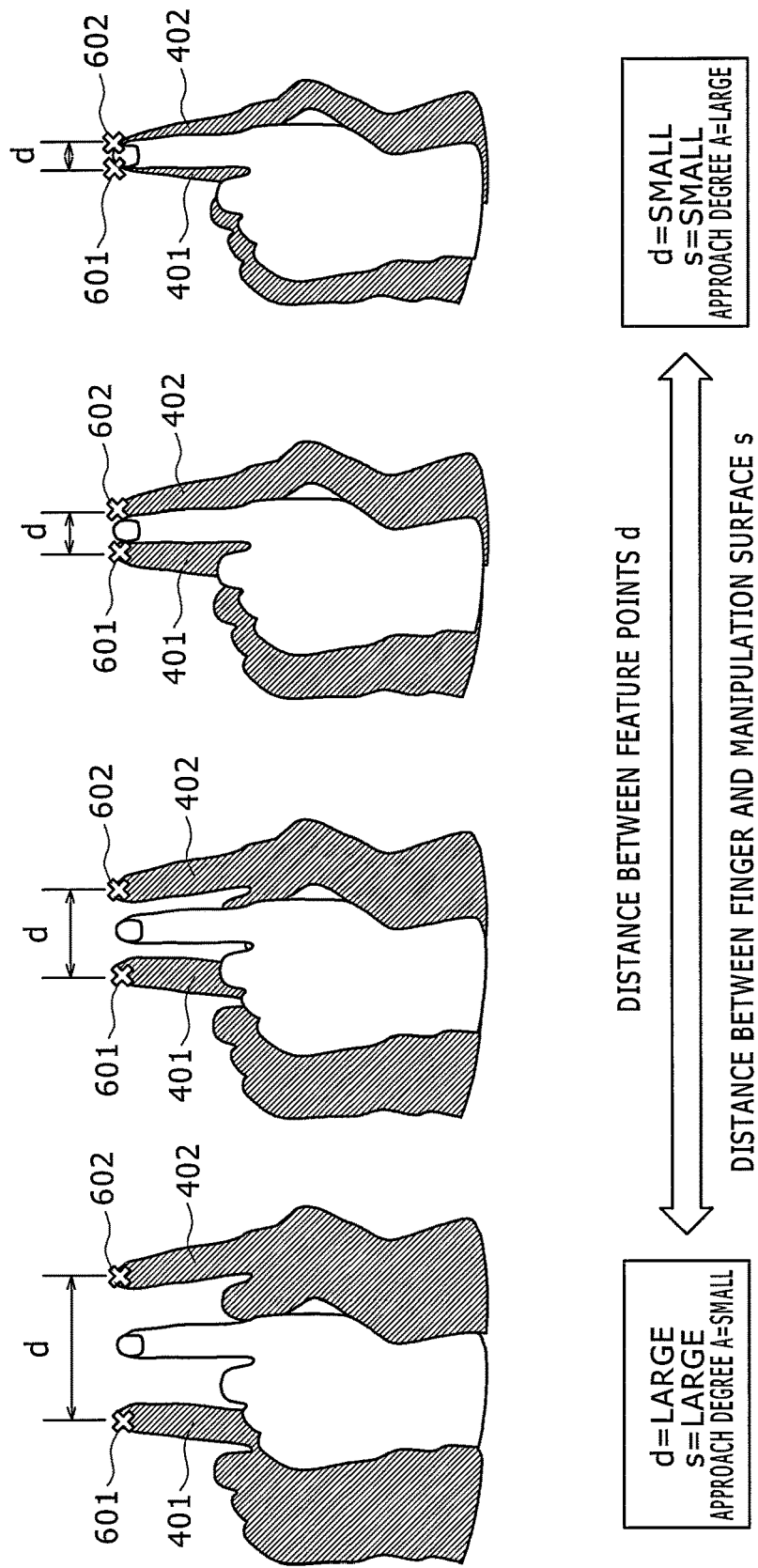
FIG. 6 illustrates the relationship between a shadow shape and a gap between the finger and the manipulation surface.

FIG. 6 illustrates the relationship between a shadow shape and a gap between the finger and the manipulation surface. The two shadows 401 and 402 are formed at both sides of the finger 30. An interval between the shadows 401 and 402 varies with gap s between the finger 30 and the manipulation surface 22. To define the interval between the two shadows 401 and 402, feature points 601 and 602 (marked with x) are placed in the shadows 401 and 402, respectively. Distance d between the feature points is measured. In FIG. 6, the feature point is placed at the tip (fingertip) of the shadow. If gap s between the finger 30 and the manipulation surface 22 is large, the interval between the shadows 401 and 402 is large and distance d between the feature points 601 and 602 is also large. Moving the finger 30 close to the manipulation surface 22 decreases distance d between the feature points 601 and 602. Putting the finger 30 into contact with the manipulation surface 22 (gap s=0) minimizes distance d between the feature points 601 and 602.

Figure 7:
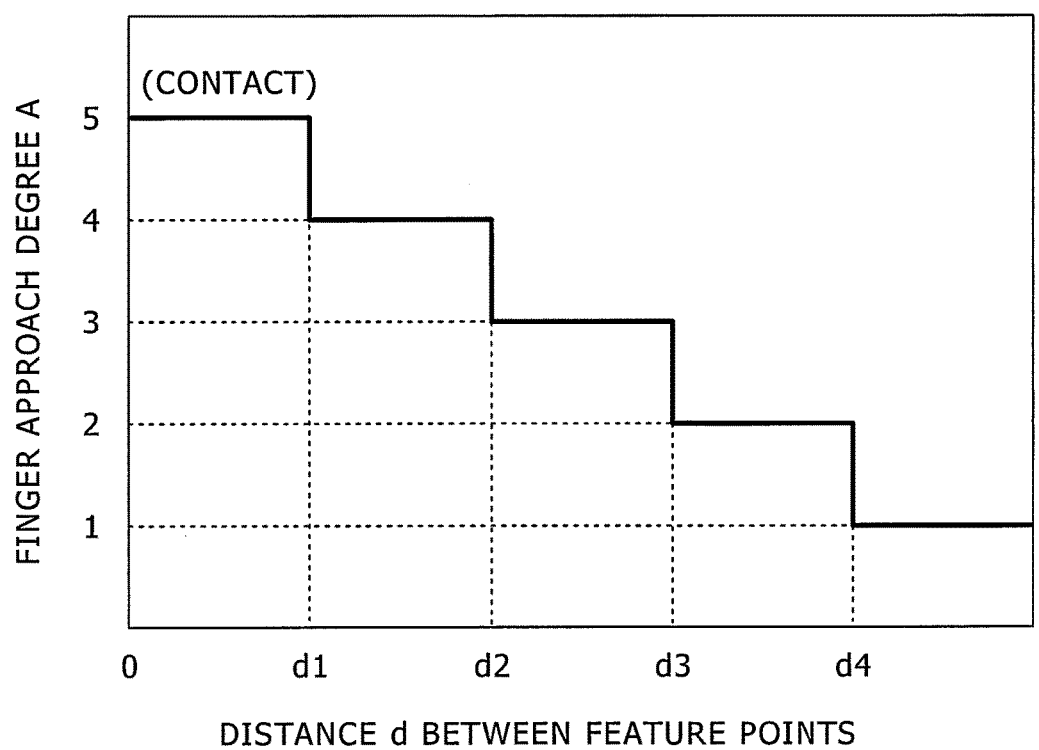
FIG. 7 illustrates determination of an approach degree according to feature points.

FIG. 7 illustrates determination of an approach degree in the approach degree detection portion 106. The approach degree detection portion 106 determines approach degree A of the finger based on distance d between the feature points. To determine approach degree A of the finger, distance d between the feature points is provided with four threshold values d1, d2, d3, and d4 (d1<d2<d3<d4). Approach degree A is classified into five levels (levels 1 through 5). Increasing the level value decreases gap s between the finger 30 and the manipulation surface 22. First, threshold value d1 is found to identify the state of the finger 30 in contact with the manipulation surface 22 (gap s=0). In the case of distance d<d1, approach degree A is assumed to be maximum level 5 (contact state). The other contactless states are classified into four levels (level 4 through 1) using threshold values d2 through d4. In the case of d>d4, approach degree A is assumed to be minimum level 1. The example classifies the approach degree into five levels according to the four threshold values. However, the approach degree is not limited to five levels and may be appropriately configured according to control contents.

Figure 8:
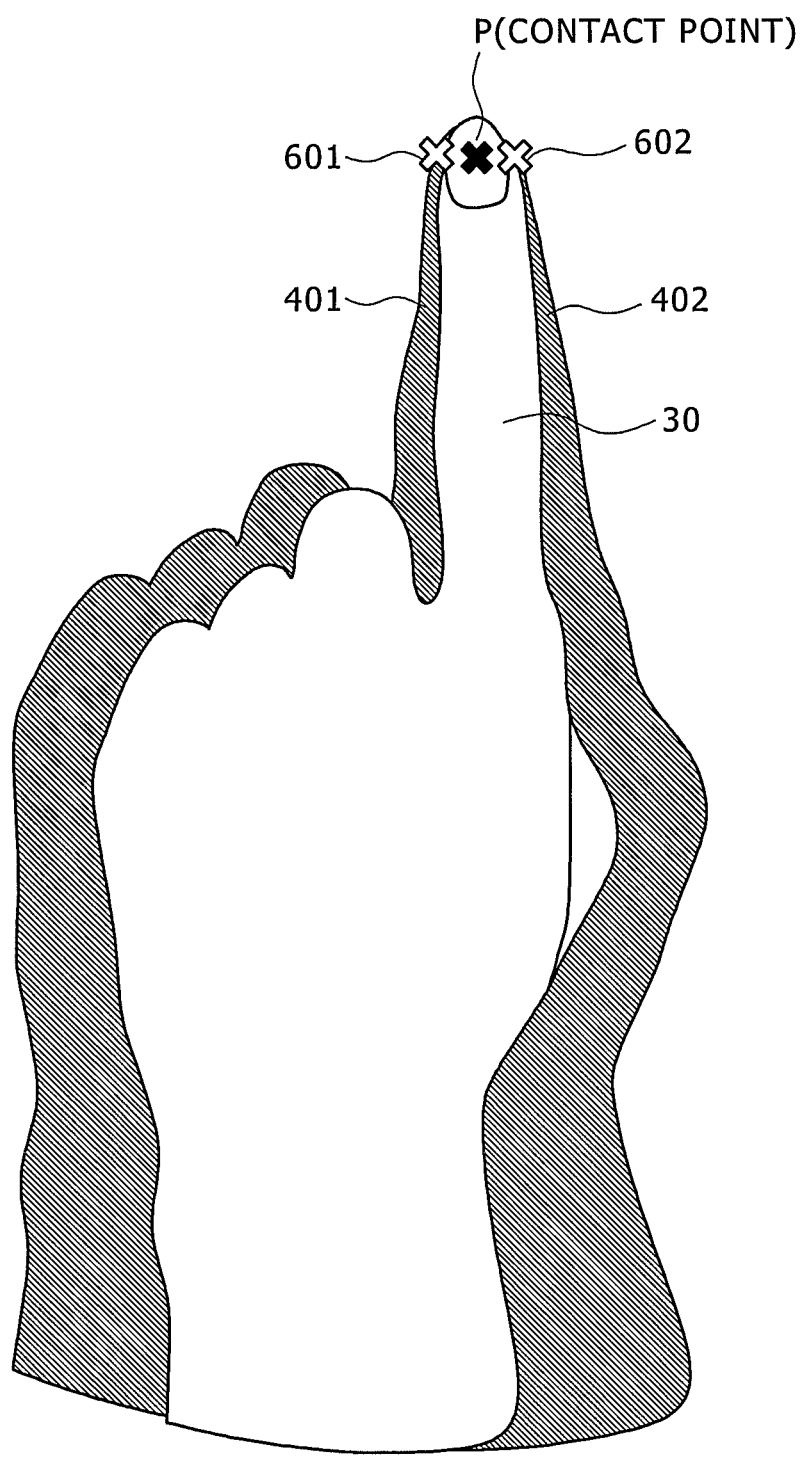
FIG. 8 illustrates determination of a contact point according to feature points.

FIG. 8 illustrates determination of a contact point in the contact point detection portion 107. The shadows 401 and 402 are formed when the finger 30 is in contact with the manipulation surface 22. The feature points 601 and 602 are settled at the tip of the shadows 401 and 402, respectively. In this case, the two feature points 601 and 602 are close to the fingertips as the contact points. Center point P between the feature points 601 and 602 is assumed to be the contact point between the finger 30 and the manipulation surface 22. Coordinates of the contact point can be calculated. In the example, the feature points 601 and 602 are settled at the tip of the shadows 401 and 402, respectively. This method can easily settle the feature points and easily determine the position of contact point P that is located near the feature points.

Figure 9:
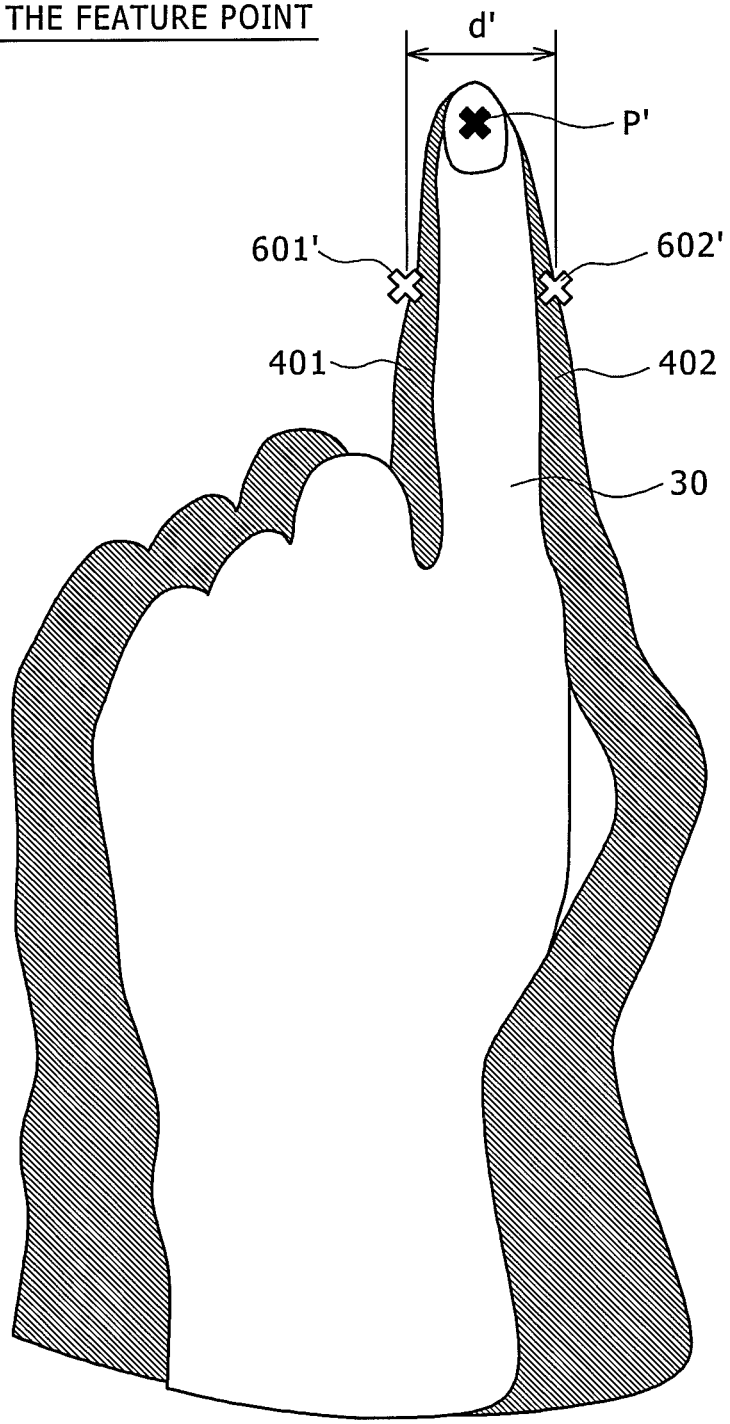
FIG. 9 illustrates a case of changing feature points to other positions.

FIG. 9 illustrates a case of changing the feature points to other positions. In FIG. 9, feature points 601' and 602' are settled at the middle in a longer direction of each shadow while the feature points 601 and 602 are settled at the tip of the shadows 401 and 402. Also in this case, distance d' between the feature points 601' and 602' changes as the interval between the shadows 401 and 402 changes. This enables to determine approach degree A between the finger 30 and the manipulation surface 22. In this case, contact point P' shifts from the positions of the feature points 601' and 602' in a longer direction. Contact point P' can be found by previously finding a distance (correction amount) to contact point P' and correcting contact point P' using the correction amount that is estimated from the feature points 601' and 602'. Similarly, the feature points may be defined at the other positions in the shadows 401 and 402.

Figure 10:
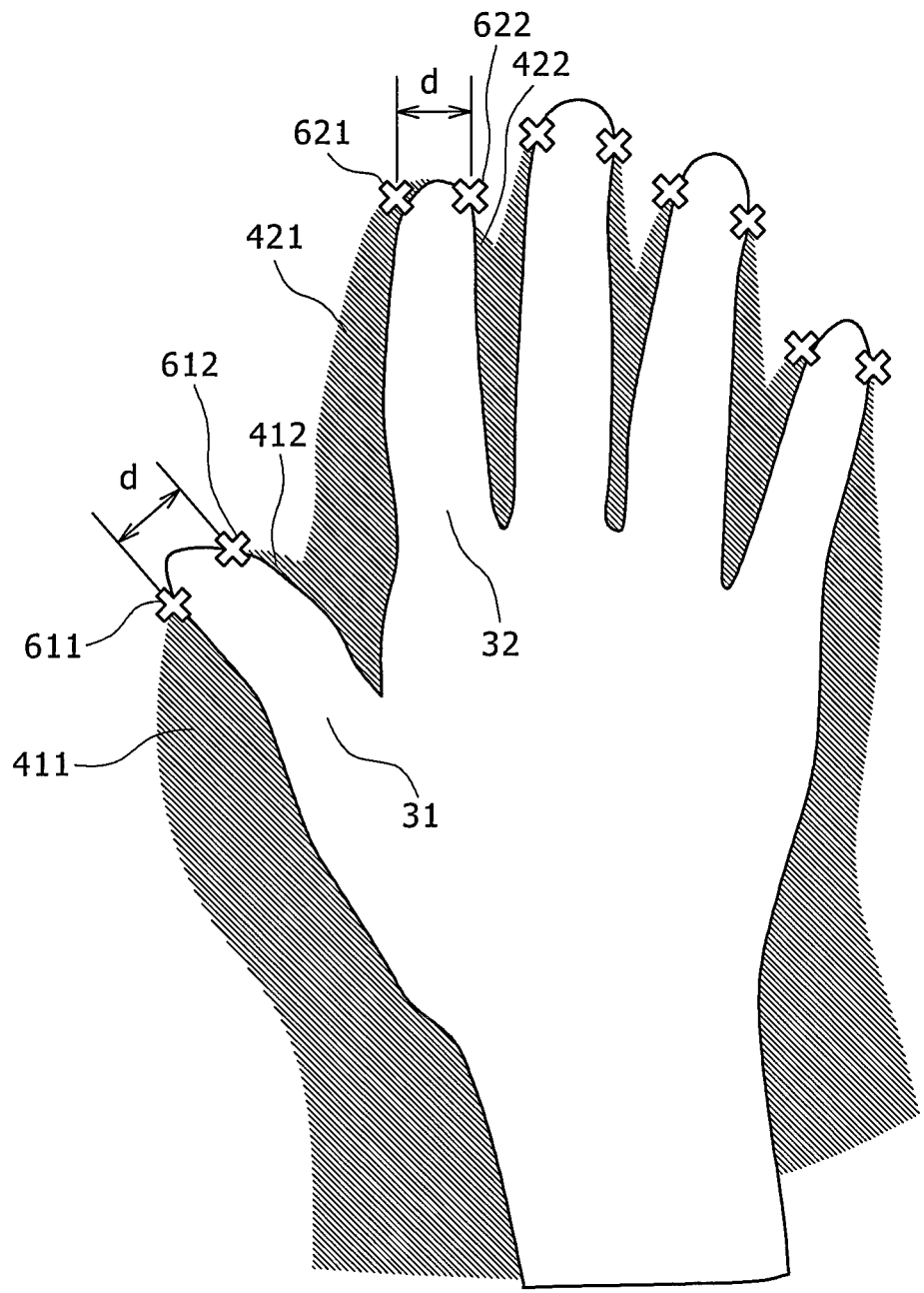
FIG. 10 illustrates shadow shapes according to manipulation of multiple fingers.

FIG. 10 illustrates shadow shapes according to manipulation of multiple fingers. With the hand open, fingers 31, 32, and so on come in contact with the manipulation surface. Then, the fingers cause left shadows 411, 421, and so on and right shadows 412, 422, and so on. Each shadow is provided with a feature point. The example in FIG. 10 illustrates feature points 611 and 612 corresponding to the shadows 411 and 412 and feature points 621 and 622 corresponding to the shadows 421 and 422. Distance d is measured between the corresponding feature points 611 and 612 or between the corresponding feature points 621 and 622. This enables to find approach degrees and contact points for the corresponding fingers 31 and 32. Even if a hand is opened, the embodiment can detect contact of multiple fingers independently and is therefore applicable to multi-touch manipulation.

Figure 11A:
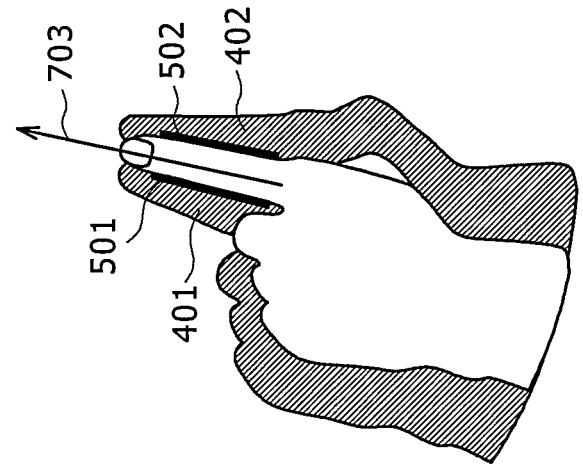
FIG. 11A illustrates the use of inner contours.
Figure 11B:
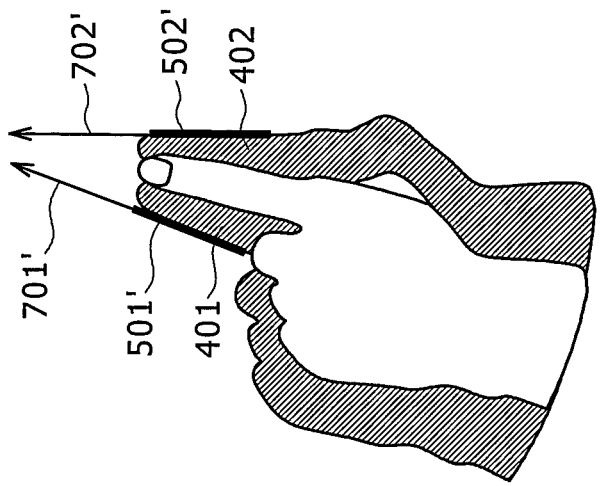
FIG. 11B illustrates the use of outer contours.
Figure 11C:
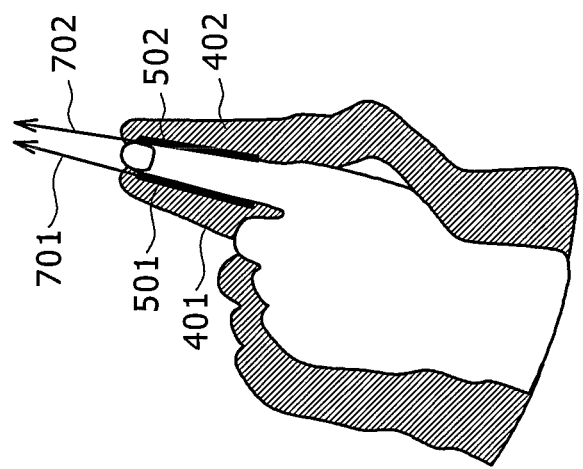
FIG. 11C illustrates a center line of contours.

FIGS. 11A to 11C illustrate determination of a finger-pointing direction in the direction detection portion 109. FIGS. 11A to 11C illustrate shapes of the shadows 401 and 402 when the direction (finger-pointing direction) of the finger 30 is tilted. Orientations of the shadows 401 and 402 change as the finger-pointing direction changes. To detect the finger-pointing direction, the contour detection portion 108 detects contours 501 and 502 of the shadows 401 and 402. The contour detection portion 108 removes curved portions such as a fingertip and detects a contour made of approximately linear line segments. The direction detection portion 109 then determines the finger-pointing direction using the method described below.

FIG. 11A uses contours 501 and 502 inside the shadows 401 and 402. The direction detection portion 109 determines one of tilt directions 701 and 702 for the inside contours 501 and 502 as the finger-pointing direction.

FIG. 11B uses contours 501' and 502' outside the shadows 401 and 402. The direction detection portion 109 determines one of tilt directions 701' and 702' for the outside contours 501' and 502' as the finger-pointing direction.

FIG. 11C uses contours 501 and 502 inside the shadows 401 and 402. The direction detection portion 109 determines a tilt direction 703 of the center line for the inner contours 501 and 502 as the finger-pointing direction. The finger-pointing direction is more accurate because it is found from an average direction for the two contours 501 and 502. A center line direction for the outer contours 501' and 502' may be defined as the finger-pointing direction.

FIGS. 12A and 12B illustrate process flows of the manipulation detection method according to the first embodiment. FIG. 12A illustrates detection of an approach degree and a contact point. FIG. 12B illustrates detection of a finger-pointing direction.

The method of detecting an approach degree and a contact point in FIG. 12A will be first described. At S1001, the shadow region extraction portion 104 removes the background from an image captured by the camera 100 to find a difference image. The shadow region extraction portion 104 extracts a shadow region whose brightness is lower than or equal to threshold value Lth. For this purpose, the shadow region extraction portion 104 performs a so-called labeling process that identifies shadow regions not connected to the extracted shadow as discrete shadows.

At S1002, the feature point detection portion 105 detects a feature point from each labeling-processed shadow. As illustrated in FIG. 6, for example, the feature point detection portion 105 detects the tips of the shadows 401 and 402 as the feature points 601 and 602. At S1003, the feature point detection portion 105 measures distance d between the two detected feature points 601 and 602.

At S1004, the approach degree detection portion 106 determines approach degree A between the finger 30 and the manipulation surface 22 based on distance d. To do this, for example, the approach degree detection portion 106 compares distance d with threshold values d1 through d4 using FIG. 7 and classifies approach degree A into levels 1 through 5. In the case of d<d1, the approach degree detection portion 106 determines approach degree A=5 (contact state).

At S1005, the approach degree detection portion 106 determines whether approach degree A satisfies the contact level (=5). If the determination result indicates approach degree A=5, control proceeds to S1006. Otherwise (contactless state), the process terminates.

At S1006, the contact point detection portion 107 detects a contact point between the finger 30 and the manipulation surface 22. As illustrated in FIG. 8, for example, the contact point detection portion 107 assumes center point P between the feature points 601 and 602 to be the contact point and calculates its coordinates. Another method may be used to define a feature point different from the above-mentioned (tip position). In such a case, the contact point position may be corrected according to the method. In a manipulation state, the above-mentioned process flow is repeated to detect the manipulation corresponding to changes in the manipulation state.

The method of detecting a finger-pointing direction in FIG. 12B will be described. At S1011, the shadow region extraction portion 104 removes the background from an image captured by the camera 100 to find a difference image. The shadow region extraction portion 104 extracts a shadow region whose brightness is lower than or equal to threshold value Lth. This process is equal to S1001 described above.

At S1012, the contour detection portion 108 detects a contour (approximately linear part) for each labeling-processed shadow. As illustrated in FIG. 11C, the contour detection portion 108 detects the contours 501 and 502 inside the shadows 401 and 402. The contour detection portion 108 removes curved parts such as a fingertip from the contour to detect an approximately linear line segment.

At S1013, the direction detection portion 109 determines that the finger-pointing direction equals the tilt direction 703 of the center line between the contours 501 and 502. The methods illustrated in FIGS. 11A and 11B may be used to determine the finger-pointing direction. In a manipulation state, the above-mentioned process flow is repeated to detect the manipulation corresponding to changes in the manipulation state. It is possible to perform the approach degree and contact point detection process in FIG. 12A concurrently with the finger-pointing direction detection process in FIG. 12B.

FIG. 13 illustrates an example of control in the display control portion 121 according to a finger approach degree. The display control portion 121 changes the manipulation mode and the pointer display according to approach degree A between the finger 30 and the manipulation surface 22.

The display control portion 121 assumes the manipulation mode to be contact manipulation mode when approach degree A is set to highest level 5 (contact state). In contactless states, the display control portion 121 enables contactless mode when approach degree A is set to relatively high level 4 or 3. The display control portion 121 enables manipulation-off mode when approach degree A is set to relatively low level 2 or 1. The above-mentioned control enables manipulation of the manipulation target apparatus 2 when the user 3 puts his or her finger 30 in contact with the manipulation surface 22 or floats the finger 30 over the manipulation surface 22. The manipulation-off mode is enabled to prevent inadvertent manipulation by the user if the finger 30 is away from the manipulation surface 22 for a specified distance or longer.

The pointer is displayed when approach degree A is set to relatively high level 5 or 4. The pointer is not displayed when approach degree A is set to relatively low level 3, 2, or 1. According to this control, the user 3 can confirm the pointer before the finger 30 comes into contact with the manipulation surface 22. This makes it possible to easily position the pointer when the finger 30 comes into contact with the manipulation surface 22. The above-mentioned control improves manipulability of the manipulation target apparatus 2.

FIGS. 14A to 14C illustrate an example of control in the display control portion 121 according to finger-pointing directions. FIG. 14A illustrates correcting the display position of a pointer 800 according to a finger-pointing direction 700. Suppose that the pointer 800 is displayed at completely the same position as contact point P detected by the contact point detection portion 107. In such a case, the pointer 800 is hidden by the finger 30 and is hardly visible from the user 3. To solve this problem, the display control portion 121 displays the pointer 800 by shifting it for a specified amount ahead of the fingertip along the finger-pointing direction 700 detected by the direction detection portion 109. The pointer 800 is easily visible from the user 3.

In addition, it may be favorable to change the amount (correction amount) of shifting the position to display the pointer 800 according to approach degree A of the finger 30. For example, the correction amount is increased when approach degree A is low. The correction amount is decreased when approach degree A is high. The position of the pointer 800 approaches the fingertip as the finger 30 of the user 3 approaches the manipulation surface 22. The user 3 is capable of accurate manipulation using the display position of the pointer 800 as a guide.

FIG. 14B illustrates correcting the display direction of the pointer 800 according to the finger-pointing direction 700. As illustrated in FIG. 14A, the arrow-shaped pointer 800 is always displayed in a predetermined direction regardless of the finger-pointing direction 700. In such a case, the display direction of the pointer 800 may differ from the finger-pointing direction and the user 3 may have a feeling of strangeness. To solve this problem, the pointer 800 is displayed so that its display direction corresponds to the finger-pointing direction 700 detected by the direction detection portion 109. This eliminates incompatibility with the finger-pointing direction 700. The user 3 can be free from a feeling of strangeness.

FIG. 14C illustrates correcting contact point positions according to the finger-pointing direction 700. The contact point detection portion 107 detects contact point P that is determined based on the feature point position. Contact point P may differ from an actual position in contact with the manipulation surface 22. If a feature point is provided at the tip of the shadow, for example, the feature point shifts toward the fingertip from an actual contact position (often the thick of a finger). To solve this problem, the contact point position is corrected (from P to P'') toward the base of the finger along the finger-pointing direction 700 detected by the direction detection portion 109. This enables to acquire the accurate contact point between the finger 30 and the manipulation surface 22.

As described above, the manipulation detection apparatus according to the first embodiment uses one camera and two light sources to analyze shapes of two shadows for a finger. The manipulation detection apparatus detects an approach degree between the finger and the manipulation surface, contact point coordinates, and the finger-pointing direction and outputs them as detection result data to the manipulation target apparatus. Based on the detection results, the manipulation detection apparatus outputs display control data to the manipulation target apparatus. The display control data is used to change the manipulation mode, the pointer display position, and the pointer display direction. The embodiment can correctly detect positions of fingers in contact with the manipulation surface and detect approach degrees and finger-pointing directions between the finger and the manipulation surface without the need to provide a touch sensor on the manipulation surface. This improves manipulability of the manipulation target apparatus. The pointer display function may be used according to types of the manipulation target apparatus and is optional for tablet terminals, for example.

The embodiment provides a feature point in each of two shadows and detects an approach degree and a contact point based on a distance between the feature points and the feature point positions. An alternative method may be used to provide contours for two shadows and detect an approach degree and a contact point based on a distance between the contours.

Second Embodiment

The first embodiment supposes that the two light sources 101 and 102 allow a finger to cause the two shadows 401 and 402 apart from each other at both sides of the finger. The second embodiment describes a method of separating two shadows from each other when the two light sources 101 and 102 are dislocated to cause the two shadows to partially overlap with each other. Separating two shadows enables to detect an approach degree between the finger and the manipulation surface, contact point coordinates, and the finger-pointing direction similarly to the first embodiment.

FIGS. 15A and 15B illustrate two shadows overlapping with each other according to the second embodiment. The two light sources 101 and 102 are placed at the same side (left in the drawing) of the camera 100. As a result, shadows 403 and 404 are formed at the same side (right) of the finger 30 and partially overlap with each other.

FIG. 15A illustrates the finger 30 not in contact with the manipulation surface 22. As seen from the top view, the finger 30 interrupts the light from the light sources 102 and 101 to generate three shadows 403, 404, and 405. The shadow 405 corresponds to a region that interrupts both light sources 102 and 101. As seen from the camera image, the shadows 403, 404, and 405 are formed to the right of the finger 30. The light source 102 forms the weak shadow 403. The light source 101 forms the weak shadow 404. The shadows 403 and 404 overlap with each other to form the strong shadow 405.

FIG. 15B illustrates the finger 30 in contact with the manipulation surface 22. The weak shadow 404 formed by the light source 10 and the strong shadow 405 are adjacently located to the right of the finger 30.

FIGS. 16A to 16D illustrate a method of separating an overlapping shadow. The shadow region extraction portion 104 separates a detected shadow into two original shadows using density differences of the detected shadow.

FIG. 16A illustrates detected shadows according to the example illustrated in FIG. 15A. As described above, the weak shadows 403 and 404 and the strong shadow 405 coexist. The strong shadow 405 results from an overlap between the weak shadows 403 and 404.

FIG. 16B illustrates a method of separating shadows. The shadow generated by the light source 102 is found as a first region 401' by adding the weak shadow 403 and the strong shadow 405. The shadow generated by the light source 101 is found as a second region 402' by adding the weak shadow 404 and the strong shadow 405. Shadow densities are identified as two levels. Regions are classified into the densities. A weak-shadow region is added to an adjacent thick-shadow region to separate the shadows into the shadows 401' and 402 generated by the respective light sources.

FIG. 16C illustrates providing the feature points 601 and 602 for the separated shadows 401' and 402' and finding distance d between the feature points.

FIG. 16D illustrates providing the contours 501 and 502 for the separated shadows 401' and 402' and finding the finger-pointing direction 703.

The two shadows 401' and 402' may partially overlap with each other due to a change in the placement of the light sources 101 and 102 with reference to the camera 100. In such a case, the second embodiment can separate the partially overlapping shadows into the original shadows 401' and 402'. Similarly to the first embodiment, the second embodiment can detect approach degrees, contact points, and finger-pointing directions. This improves flexibility in the placement of light sources.

The embodiment uses a difference between shadow densities to separate a shadow into the two shadows 401' and 402'. Another method may separate shadows by alternately turning on the light sources 101 and 102 and capturing images whose shadows change on a frame basis. Still another method may separate shadows by adjusting the light sources 101 and 102 to cause different wavelengths of light and using cameras corresponding to the wavelengths.

Third Embodiment

The third embodiment describes the configuration of a projector incorporating the above-mentioned manipulation detection apparatus 1.

Figure 17:
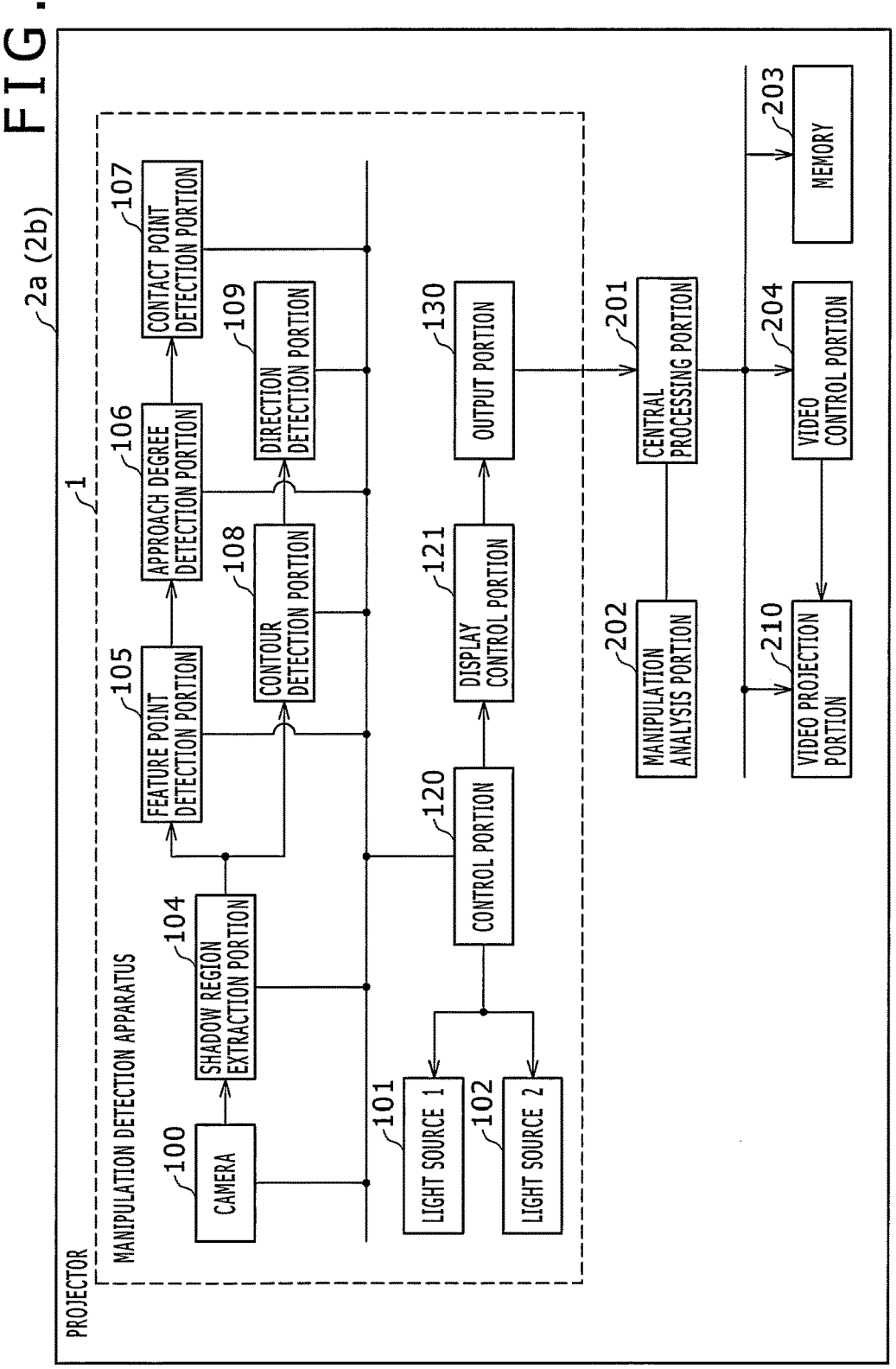
FIG. 17 is a configuration diagram illustrating a projector incorporating the manipulation detection apparatus (third embodiment)

FIG. 17 is a configuration diagram illustrating a projector 2a (2b) according to the third embodiment. The projector 2a (2b) incorporates a projector function to project videos as well as the manipulation detection apparatus 1 described in the first embodiment (FIG. 1). The projector functions include a central processing portion 201, a manipulation analysis portion 202, memory 203, a video control portion 204, and a video projection portion 210.

The central processing portion 201 includes semiconductor chips such as a central processing unit (CPU) and software such as an operating system (OS). The central processing portion 201 controls information input to or output from the memory and various portions such as the video control portion 204 and the video projection portion 210 based on user manipulations analyzed by the manipulation analysis portion 202. The central processing portion 201 changes the manipulation mode to the contact manipulation mode, the contactless manipulation mode, or the manipulation-off mode based on the display control data 151 (manipulation mode) acquired from the output portion 130 of the manipulation detection apparatus 1.

The manipulation analysis portion 202 includes a circuit board and software. The manipulation analysis portion 202 analyzes the contents of user manipulation corresponding to projected videos based on the detection result data 150 (approach degree, contact point, and finger-pointing direction) acquired from the output portion 130 of the manipulation detection apparatus 1.

The memory 203 includes a semiconductor device. The memory 203 stores information needed for calculation and control in the central processing portion 201 and video information to be displayed as projection videos.

The video control portion 204 includes a circuit board. The video control portion 204 performs calculation processes needed to render video information under control of the central processing portion 201. The video control portion 204 outputs rendering information including sets of pixels using a format appropriate to input to the video projection portion 210. The video control portion 204 changes conditions of drawing a pointer overlapping with video based on the display control data 151 (pointer position and direction) acquired from the output portion 130 of the manipulation detection apparatus.

The video projection portion 210 includes a light source such as a lamp, optical components such as a lens and a reflective mirror, and a liquid crystal panel. The video projection portion 210 modulates a light flux radiated from the light source, generates image light corresponding to the rendering information supplied from the video control portion 204, and projects enlarged image light onto a projection plane such as a screen.

The portions in FIG. 17 are independent of each other but may be configured to use one or more configuration requirements. For example, the portions 201 through 204 may be configured to perform the respective processes using one or more semiconductor chips including a system-on-a-chip (SoC).

FIGS. 18A and 18B illustrate a short-distance projector 2a used as the above-mentioned projector. FIG. 18A is a front view and FIG. 18B is a side view. The short-distance projector 2a is mounted on the top of a wall surface 21. The video projection portion 210 radiates projection light 23a based on a predetermined video signal such as GUI to display projection video 23 onto a screen 22' on the wall surface 21. The user 3 manipulates his or her finger on the screen 22' also functioning as the manipulation surface to enable intended control over the projection video 23.

Suppose that the user 3 allows his or her finger 30 to touch or approach a given location on the projection video 23. The manipulation detection apparatus 1 then detects an approach degree, a contact point, and a finger-pointing direction from a shadow image of the finger and transmits the detection result data 150 to the manipulation analysis portion 202 via the central processing portion 201. The manipulation analysis portion 202 analyzes the contents of manipulation on the projection video 23. The central processing portion 201 performs processes such as changing the video in response to the user manipulation. The manipulation detection apparatus 1 generates the display control data 151 (manipulation mode, pointer position, and pointer direction) based on the detection result data 150 and transmits the display control data 151 to the video control portion 204 via the central processing portion 201. The user can efficiently manipulate the projection video because the projector 2a incorporates the manipulation detection apparatus 1.

Figure 19A:
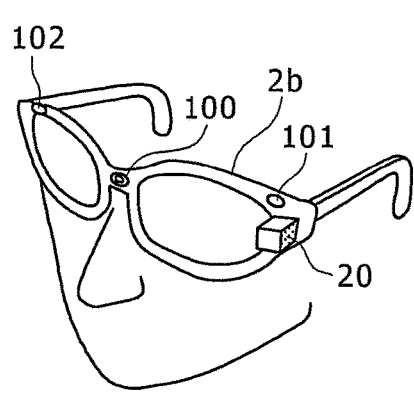
FIG. 19A is an external view and FIG. 19B is a top view.
Figure 19B:
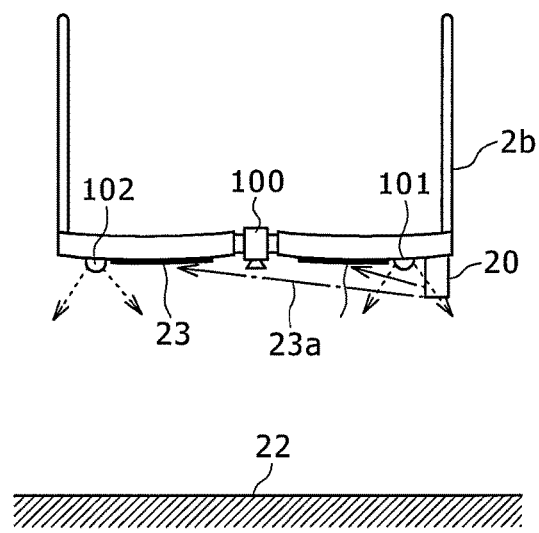

FIGS. 19A and 19B illustrate a head-mount projector 2b as another configuration of the projector. FIG. 19A is an external view and FIG. 19B is a top view. The head-mount projector 2b includes a small projector body 20 attached to a glasses-type frame. The projection light 23a is radiated to a lens surface of the glasses to display a video 23. A user can view the video.

The light sources 101 and 102 are attached to both ends of the glasses-type frame. The camera 100 is attached to the center of the frame. The head-mount projector 2b can illuminate the manipulation surface 22 ahead of the user's visual line, capture manipulation of the user's finger with reference to the manipulation surface 22, and detect approach degrees and contact points of the user's finger The small projector body 20 projects the video 23 to the glasses' lens surface while the user manipulates the manipulation surface 22. The video 23 and the manipulation surface 22 overlap with each other in the user's sight. The user perceives as if the video were displayed on the manipulation surface 22. When the small projector body 20 displays the video, the user can manually manipulate the manipulation surface 22 and control the displayed video.

As described above, the projector 2a or 2b containing the manipulation detection apparatus 1 requires no sensor on the video projection plane. The user is capable of efficient manipulation including multi-touch manipulation on projection video. The projector usability improves.

The above-mentioned embodiments provide examples for description of the present invention and are not intended to limit the scope of the invention.

What is claimed is:
1. A projector comprising:
a projection portion to project video on a vertical surface;
a first light source and a second light source, each of which radiates illumination light from different positions from each other to a manipulation surface that at least partially overlaps with video projected on the vertical surface by the projection portion;
a single camera to capture a user's finger and both a first shadow and a second shadow on the manipulation surface, when the user's finger is located between the single camera and the manipulation surface, wherein the first shadow is caused by the user's finger with the first light source, and the second shadow is caused by the user's finger with the second light source;
a shadow region extraction portion that extracts the first shadow and the second shadows corresponding to the user's finger based on an image captured by the single camera;
a manipulation state detection portion that detects at least one of manipulation states such as an approach degree, a contact point, and a direction indicated by the user's finger with reference to the manipulation surface from shapes of the extracted first shadow and the extracted second shadow, wherein all of the projection portion, the single camera, the first light source and the second light source are mounted on a body of the projector, and none of them are arranged at a manipulation surface side, wherein the first light source and the second light source are mounted on the body of the projector separately in a horizontal direction from the front view to the manipulation surface, wherein the projection portion and the single camera are mounted on the body of the projector between the first light source and the second light source in the horizontal direction, wherein all of the projection portion, the single camera, the first light source and the second light source are arranged at a space positioned higher than a top position of the projected video so that video image light projected by the projection portion can pass through by short distance projection between the vertical surface and a head of the user who can touch the vertical surface and the single camera can capture the user's finger located between the user's head and the vertical surface, and wherein both the first light source and the second light source are arranged at closer position to the manipulation surface than the projection portion in the direction perpendicular to the manipulation surface in the space positioned higher than the top position of the projected video.

2. The projector according to claim 1, wherein the manipulation state detection portion includes:

a feature point detection portion to detect a feature point from each of the extracted first shadow and the extracted second shadow;

a contour detection portion to detect an approximately linear line segment as each contour of the extracted first shadow and the extracted second shadow from contours of the extracted first shadow and the extracted second shadow;

an approach degree detection portion to detect an approach degree for the user's finger toward the manipulation surface from a distance between the two detected feature points;

a contact point detection portion to detect a contact point for the user's finger on the manipulation surface from positions of the two detected feature points; and a direction detection portion to detect a pointing direction of the user's finger from a direction of the detected contour, wherein the approach degree detection portion determines contact of the user's finger with the manipulation surface based on a distance between the two detected feature points.

3. The projector according to claim 2, wherein the feature point detection portion detects a tip position of the finger in each of the extracted first shadow and the extracted second shadow as the feature point; and wherein the contact point detection portion detects a center position of the two detected feature points as the contact point.

4. The projector according to claim 2, wherein, when the extracted first shadow and the extracted second shadow are extracted while overlapping with each other, the shadow region extraction portion adds a weak-shadow region and an adjacent strong-shadow region to separate the overlapping shadows into the first shadow and the second shadow resulting from the first light source and the second light source.

5. The projector according to claim 1, comprising:

a display control portion to generate display control data for a manipulation target apparatus connected to the manipulation detection apparatus based on a detection result including an approach degree, a contact point, and a direction pointed by a finger detected by the manipulation state detection portion.

6. The projector according to claim 5, wherein the display control data generated by the display control portion contains at least one of manipulation mode changeover, pointer display position correction, pointer display direction correction, and contact point position correction.

* * * * *